A. BUTTON.
Seeder and Harrow.

No. 106,546.  Patented Oct. 23, 1870.

United States Patent Office.

ALPHONSO BUTTON, OF DUNKIRK, NEW YORK.

Letters Patent No. 106,546, dated August 23, 1870.

IMPROVEMENT IN SEEDING-MACHINES.

The Schedule referred to in these Letters Patent and making part of the same.

*To all whom it may concern:*

Be it known that I, ALPHONSO BUTTON, of Dunkirk, in the county of Chautauqua and State of New York, have invented a new and improved Sower and Harrow; and I do hereby declare that the following is a full, clear, and exact description thereof, which will enable others skilled in the art to make and use the same, reference being had to the accompanying drawing forming a part of this specification.

This invention relates to improvements in sowing and harrowing apparatus, and consists in certain features of novelty which will be more particularly pointed out hereinafter.

Similar letters of reference indicate corresponding parts.

Figure 1:
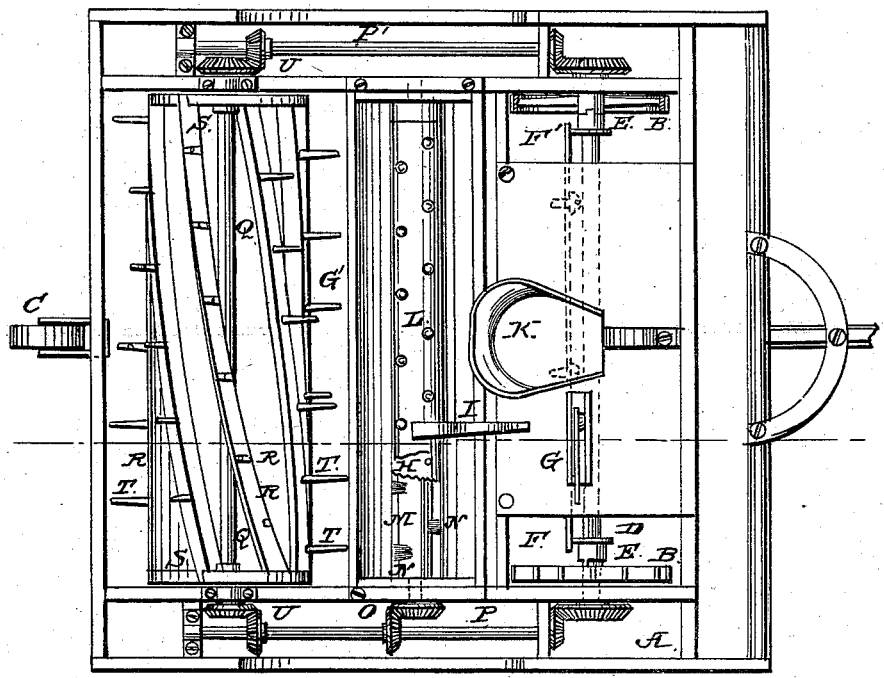
Figure 1 is a plan view of my improved machine.
Figure 2:
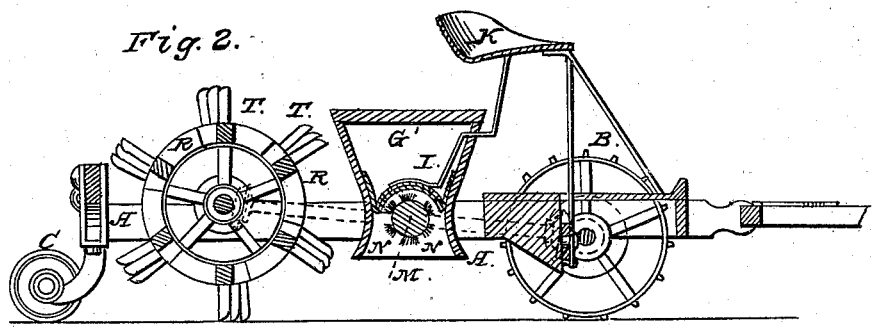
Figure 2 is a sectional elevation of the same taken on the line $x\ x$ of fig. 1.

A is a broad truck-frame, mounted on the two driving-wheels, B, and the caster-wheel C.

The wheels work loosely on the shaft D, and are arranged in the hubs to clutch with sliding clutches, E, on the shaft, feathered to it, so as to communicate motion thereto when required.

These clutches are connected by rods or bars, F F', to the vibrating hand-lever, one above and the other below the pivot thereof, so that the movement of the lever in one direction will throw the clutches out of connection with the hubs of the wheels, and the movement in the other direction will throw them into gear with the hubs.

G' is the seed-trough or hopper. It traverses the frame, and is provided with a convex perforated bottom, H, and over it is a convex gate, L, with perforations, which will, when in one position, coincide with those of the bottom.

This gate is capable of sliding on the bottom H, to open or close the passages for the grain, and is provided with a handle, I, for the purpose, rising up near the driver's seat K.

Under the convex bottom H of the seed trough is a revolving cylinder, M, with brushes, N, arranged to act on the lower mouths of the seed-holes, to keep them from clogging, and to regulate the discharge of the grain.

This brush-cylinder is operated by gear-wheels, O, deriving motion from a line-shaft, P, running from front to rear, and gearing with the driving-shaft D, also gearing with the shaft Q of the revolving harrow, traversing the frame behind the seed-trough and carrying a skeleton frame of spirally-curved bars, R, mounted on the peripheries of the drum-heads S, at the ends.

These bars support the projecting teeth T, which may be either in radial lines or lines slightly curved forward.

This harrow is also revolved by the shaft P and another similar shaft, P', on the other side, both being connected by bevel-wheels U.

These teeth, striking upon the lumps and clods as they go into the ground, will pulverize them much more effectually than the teeth of such harrows as are drawn along the ground can do, and rising upward as they do, out of the ground at the front side, they have an action calculated to leave the ground much lighter than the present style will.

I do not desire to limit myself to the arrangement of gear-wheels and shafts shown for communicating the motion from the driving-wheels, as I may use other arrangements of gearing, or endless chains and chain-wheels may be used to advantage.

Having thus described my invention,

I claim as new and desire to secure by Letters Patent—

1. The combination, on a truck-frame A, of the broad-cast sower, consisting of the trough G' and brush-cylinder, arranged and operating as described.

2. The combination with the perforated convex bottom H, and brush-cylinder M, of the convex sliding and perforated gate L, substantially as specified.

3. Combining, in the hopper of a broad-cast seeder, two upwardly-convex and perforated plates, H L, the upper sliding over the lower, to regulate the supply of seed, in the manner shown and described.

A. BUTTON.

Witnesses:
J. B. ARCHIBALD,
C. D. MURRAY.